United States Patent
Mattis et al.

(10) Patent No.: US 12,175,260 B2
(45) Date of Patent: Dec. 24, 2024

(54) NETWORK MANAGEMENT FOR VEHICLE OPERATING SYSTEMS

(71) Applicant: Google LLC, Mountain View, CA (US)

(72) Inventors: James Mattis, Palo Alto, CA (US); Jean Chalard, Adachi Ku (JP); Fengming Yang, Sunnyvale, CA (US); Kevin Robert Meier, Belmont, CA (US); Ryan Weekes, Los Altos, CA (US)

(73) Assignee: Google LLC, Mountain View, CA (US)

( * ) Notice: Subject to any disclaimer, the term of this patent is extended or adjusted under 35 U.S.C. 154(b) by 217 days.

(21) Appl. No.: 17/822,397

(22) Filed: Aug. 25, 2022

(65) Prior Publication Data

US 2024/0069928 A1 Feb. 29, 2024

(51) Int. Cl.
| | |
|---|---|
| *G06F 21/00* | (2013.01) |
| *G06F 9/445* | (2018.01) |
| *G06F 9/54* | (2006.01) |
| *H04L 9/40* | (2022.01) |

(Continued)

(52) U.S. Cl.
CPC .......... *G06F 9/44505* (2013.01); *G06F 9/547* (2013.01); *H04L 61/5014* (2022.05); *H04L 63/20* (2013.01); *H04L 67/12* (2013.01)

(58) Field of Classification Search
CPC . G06F 9/44505; G06F 9/547; H04L 61/5014; H04L 63/20; H04L 67/12; H04L 41/0806; H04L 12/413; H04L 67/025
See application file for complete search history.

(56) References Cited

U.S. PATENT DOCUMENTS

| | | | |
|---|---|---|---|
| 10,331,425 B2 | 6/2019 | Mount | |
| 10,511,492 B2 * | 12/2019 | Kanojia | ................ G06F 3/0488 |
| 2010/0306769 A1 | 12/2010 | Schneider | |

(Continued)

FOREIGN PATENT DOCUMENTS

| | | | |
|---|---|---|---|
| EP | 3043526 B1 * | 9/2018 | ......... H04L 41/0809 |
| WO | 1998059293 A1 | 12/1998 | |
| WO | 2020231952 A1 | 11/2020 | |

OTHER PUBLICATIONS

Android Developers, "Manage all files on a storage device", Retrieved from https://developer.android.com/training/data-storage/manage-all-files, Feb. 16, 2022, 4 pp.

(Continued)

*Primary Examiner* — Ka Shan Choy
(74) *Attorney, Agent, or Firm* — Shumaker & Sieffert, P.A.

(57) ABSTRACT

A vehicle head unit comprising a memory configured to store an operating system, and one or more processors may be configured to perform various aspects of the techniques. The one or more processors may obtain an indication of one or more vehicle networks, and execute the operating system that presents a single application programming interface that provides function calls by which to configure the one or more vehicle networks within the operating system. The one or more processors may also configure, via the single application programming interface, one or more network interfaces for the one or more vehicle networks in the operating system by which one or more applications, executing in an application space presented by the operating system, interface with the one or more vehicle networks.

18 Claims, 6 Drawing Sheets

(51) Int. Cl.
*H04L 61/5014* (2022.01)
*H04L 67/12* (2022.01)

(56) References Cited

U.S. PATENT DOCUMENTS

| | | | |
|---|---|---|---|
| 2014/0040343 A1 | 2/2014 | Nickolov et al. | |
| 2014/0068010 A1* | 3/2014 | Nicholson | H04L 67/12 |
| | | | 709/219 |
| 2015/0088420 A1* | 3/2015 | Foster | B60K 35/10 |
| | | | 715/771 |
| 2016/0224355 A1 | 8/2016 | Okubo | |
| 2016/0328197 A1* | 11/2016 | Bai | G06F 3/1454 |
| 2018/0109624 A1* | 4/2018 | Jayaraman | H04W 12/37 |
| 2019/0379682 A1* | 12/2019 | Overby | H04L 9/002 |
| 2022/0391236 A1 | 12/2022 | Isert et al. | |
| 2023/0376307 A1 | 11/2023 | Isert et al. | |

OTHER PUBLICATIONS

International Search Report and Written Opinion of International Application No. PCT/US2023/067874 dated Sep. 22, 2023, 13 pp.

\* cited by examiner

NETWORK MANAGEMENT FOR VEHICLE OPERATING SYSTEMS

BACKGROUND

A vehicle may include a so-called "head unit" or other integrated computing device that presents an interface (such as a graphical user interface—GUI) by which to control the vehicle systems, such as a heating, ventilation, and air conditioning (HVAC) system, a lighting system (for controlling interior and/or exterior lights), an infotainment system (including standard amplitude modulated—AM—radio, frequency modulated—FM—radio, streaming radio, video playback, audio playback, etc.), a seating system (for controlling a position of a driver and/or passenger seat), a mirror system (for controlling exterior and/or interior mirrors), a telematics system (for capturing data related to vehicle use and/or activity), a over-the-air-update system (for updating firmware and/or other software executed by the vehicle), etc. The head unit may issue one or more commands (also referred to herein as "command sets") to the vehicle systems to change an operational state of one or more of the vehicle systems.

As vehicles, such as an automobile, motorcycle, a bus, a recreational vehicle (RV), a semi-trailer truck, a tractor or other type of farm equipment, a train, a plane, a drone, a helicopter, a personal transport vehicle, or the like, continue to evolve, such vehicles may begin to implement various networks for interconnecting vehicle systems to the head unit. Recently, vehicles have turned to standard layer two networks (such as Ethernet networks) to facilitate communication between various vehicle systems. While Ethernet networks (or other layer two networks) may provide uniform network access between vehicle systems, operating systems (which may be referred to as vehicle operating systems) executed by the head unit may be difficult to configure in terms of presenting such networks for use by applications executing within an execution environment provided by the operating systems.

SUMMARY

In general, techniques of this disclosure are directed to enabling efficient configuration of network management for applications executed by vehicle head units. Rather than resort to so-called "low-level" management of networks, various aspects of the techniques enable vehicle operating systems executed by vehicle head units to present a single application programming interface (API) by which to configure network access and control for applications executed in an application space (as opposed to a secure kernel space) of the vehicle operating system. Via this single API, applications may register a call, with the vehicle operating system, for network access to particular vehicle networks that interconnect the vehicle head unit executing the vehicle operating system to various vehicle systems. The vehicle operating system may be configured to implement access control lists (ACLs) and use the ACLs to determine whether a particular application attempting to register a call for vehicle network access is able to access the underlying vehicle network. If authorized via the ACLs, the vehicle operating system may configure an interface (which may be a virtual interface) by which the particular application may access the underlying vehicle network, including assigning a network address (e.g., an Internet protocol—IP—address).

In this way, rather than resort to complicated so-called "low-level" configuration in which manufacturers of vehicles independently statically configure (or, in other words, "hard code") vehicle network configuration for each application, such vehicle manufacturers may program applications or allow third party application developers to develop applications that interface with the single API presented natively by the vehicle operating system to perform network management. The vehicle manufacturers may deploy ACLs that limit or allow access to the underlying vehicle networks based on application approval processes that conform with laws of various jurisdictions in which vehicles are sold.

Moreover, vehicle operating systems may be developed that accommodate the various laws of jurisdictions while also enabling vehicle network access for applications executed by the vehicle operating system. Given that vehicle network access may be managed via the single API, manufactures of vehicles may not require dedicated computer programmers to "hard code" network access, but may facilitate independent network management by application developers (including first party and third party application developers). As this single API is managed by the developers of the vehicle operating system, such vehicle network management may be supported natively as the vehicle operating system undergoes additional development and revisions.

As such, the single network management API may facilitate more efficient operation of the vehicle operating system while also improving access to vehicle networks by applications executed by the vehicle operating system. Vehicle operating systems may operate more efficiently as the single API may reduce errors introduced by such "hard coded" network management that may result in errors (security or otherwise) that may introduce issues of safety or vehicle network exploitation that results in efficient use of computing resources of the vehicle head unit (e.g., in terms of processor cycles, memory, memory bandwidth, and associated power). Further, given the unified single API for network management, application developers may secure access to certain vehicle networks via manufacture verification, while also allowing manufacturers to disable vehicle network access to vehicle systems that may impose a security and/or safety risk, thereby improving the safety and/or security of the vehicle itself.

In one example, various aspects of the techniques are directed to a method comprising: obtaining, by one or more processors of a vehicle head unit, an indication of one or more vehicle networks; executing, by the one or more processors, an operating system that presents a single application programming interface that provides function calls by which to configure the one or more vehicle networks within the operating system; and configuring, via the single application programming interface, one or more network interfaces for the one or more vehicle networks in the operating system by which one or more applications, executing in an application space presented by the operating system, interface with the one or more vehicle networks.

In another example, various aspects of the techniques are directed to a vehicle head unit comprising: a memory configured to store an operating system; and one or more processors configured to: obtain an indication of one or more vehicle networks; execute the operating system that presents a single application programming interface that provides function calls by which to configure the one or more vehicle networks within the operating system; and configure, via the single application programming interface, one or more network interfaces for the one or more vehicle networks in the operating system by which one or more applications, executing in an application space presented by the operating system, interface with the one or more vehicle networks.

In another example, various aspects of the techniques are directed to a non-transitory computer-readable storage medium having instructions stored thereon that, when executed, cause one or more processors of a vehicle head unit to: obtain an indication of one or more vehicle networks; execute an operating system that presents a single application programming interface that provides function calls by which to configure the one or more vehicle networks within the operating system; and configure, via the single application programming interface, one or more network interfaces for the one or more vehicle networks in the operating system by which one or more applications, executing in an application space presented by the operating system, interface with the one or more vehicle networks.

The details of one or more examples are set forth in the accompanying drawings and the description below. Other features, objects, and advantages of the disclosure will be apparent from the description and drawings, and from the claims.

DETAILED DESCRIPTION

Figure 1:
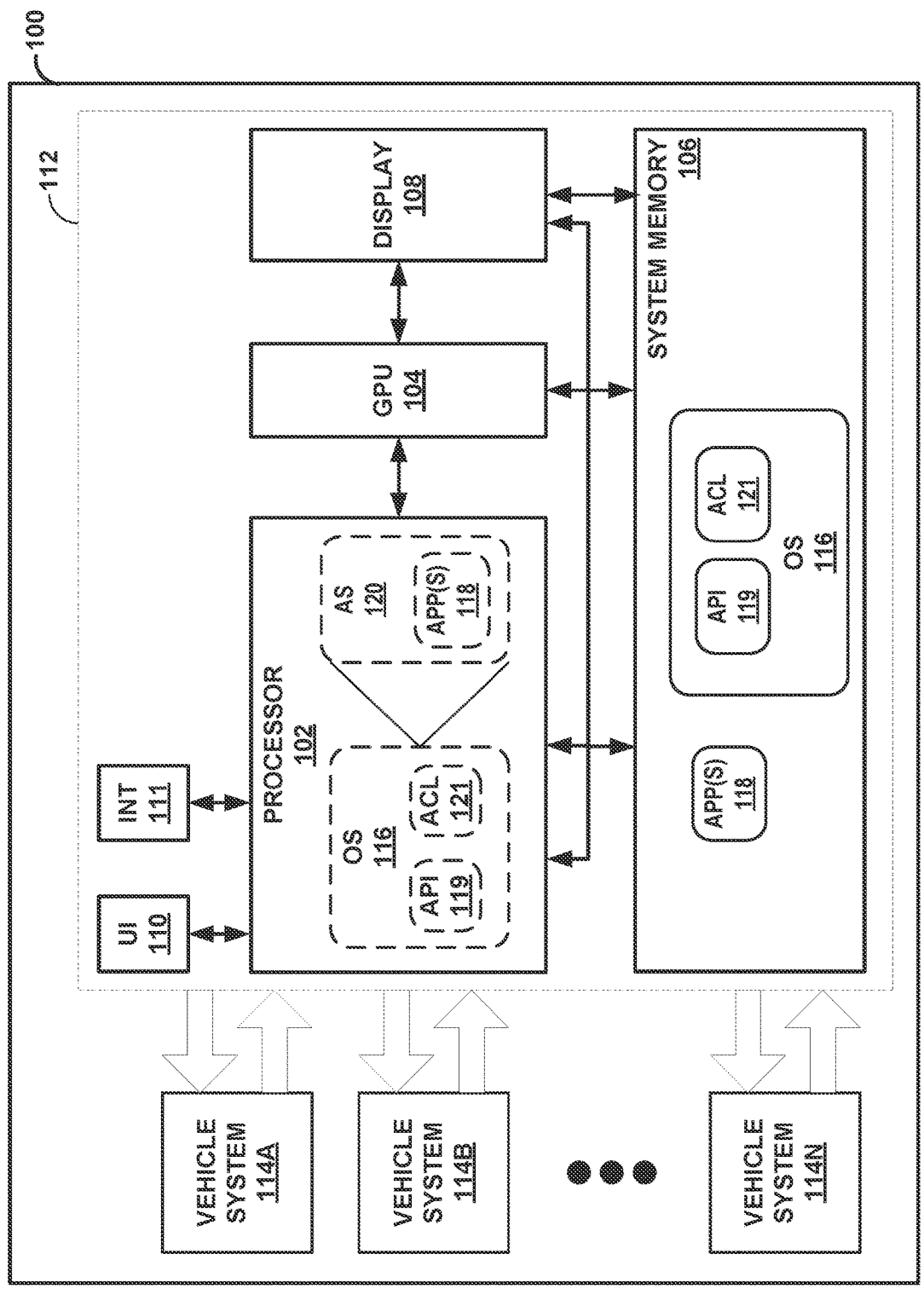
FIG. 1 is a block diagram illustrating an example vehicle configured to perform various aspects of the techniques described in this disclosure.

FIG. 1 is a block diagram illustrating an example vehicle 100 configured to perform various aspects of the techniques described in this disclosure. In the example of FIG. 1, vehicle 100 is assumed in the description below to be an automobile. However, the techniques described in this disclosure may apply to any type of vehicle that utilizes networks for communication between vehicle systems, where such vehicle may include a motorcycle, a bus, a recreational vehicle (RV), a semi-trailer truck, a tractor or other type of farm equipment, a train, a plane, a drone, a helicopter, a personal transport vehicle, and the like. In some examples, vehicle 100 may be an autonomous vehicle.

In the example of FIG. 1, vehicle 100 includes a processor 102, a graphics processing unit (GPU) 104, and system memory 106. In some examples, processor 102, GPU 104, and a transceiver module (not shown in FIG. 1) may be formed as an integrated circuit (IC). For example, the IC may be considered as a processing chip within a chip package, and may be a system-on-chip (SoC).

Examples of processor 102, and GPU 104 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 102 may represent a central processing unit (CPU) of vehicle 100. In some examples, GPU 104 may be specialized hardware that includes integrated and/or discrete logic circuitry that provides GPU 104 with massive parallel processing capabilities suitable for graphics processing. In some instances, GPU 104 may also include general purpose processing capabilities, and may be referred to as a general purpose GPU (GPGPU) when implementing general purpose processing tasks (e.g., non-graphics related tasks). Although shown as a dedicated GPU 104, GPU 104 may represent an integrated GPU that is integrated into the underlying circuit board (such as a so-called "motherboard"), or otherwise incorporated into processor 102.

Processor 102 may execute various types of applications 118. Examples of the applications include web browsers, navigation application, radio applications (including streaming music applications), texting applications, car management applications, system settings applications, vehicle system control applications (for, as some examples, heating, venting, and air conditioning (HVAC) systems, mirror systems, seating systems, lighting system, and/or any other systems represented by vehicle systems 114A-114N), e-mail applications, spreadsheet applications, video games, or other applications that may generate viewable objects for display or otherwise interface with vehicle 100. System memory 106 may store instructions for execution of one or more applications 118. The execution of applications 118 by processor 102 causes processor 102 to produce graphics data for image content that is to be displayed via, as an example, a display 108. Processor 102 may transmit graphics data of the image content to GPU 104 for further processing based on instructions or commands that processor 102 transmits to GPU 104.

Processor 102 may communicate with GPU 104 in accordance with an application programming interface (API). Moreover, the techniques described in this disclosure are not required to function in accordance with an API, and processor 102 and GPU 104 may utilize any technique for communicating with GPU 104.

System memory 106 may represent a memory for vehicle 8. System memory 106 may comprise one or more computer-readable storage media. Examples of system memory 106 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor. In some aspects, system memory 106 may include instructions that cause processor 102 to perform the functions ascribed in this disclosure to processor 102. Accordingly, system memory 106 may represent a non-transitory computer-readable storage medium having instructions stored thereon that, when executed, cause one or more processors (e.g., processor 102) to perform various functions.

As such, system memory 106 may represent, in other words, a non-transitory storage medium. The term "non-transitory" indicates that the storage medium is not embodied in a carrier wave or a propagated signal. However, the term "non-transitory" should not be interpreted to mean that system memory 106 is non-movable or that its contents are static. As one example, system memory 106 may be removed from vehicle 100, and moved to another device. As another example, memory, substantially similar to system memory 106, may be inserted into vehicle 100. In certain examples, a non-transitory storage medium may store data that can, over time, change (e.g., in RAM).

As further shown in the example of FIG. 1, vehicle 100 may include a display 108 and a user interface 110. Display 108 may represent any type of passive reflective screen on which images can be projected, or an active reflective or emissive or transmissive display capable of displaying images (such as a light emitting diode (LED) display, an organic LED (OLED) display, liquid crystal display (LCD), or any other type of active display). Although shown as including a single display 108, vehicle 100 may include a number of displays that may be positioned throughout a cabin of vehicle 100. In some examples, passive versions of display 108 or certain types of active versions of display 108 (e.g., OLED displays) may be integrated into seats, tables, roof liners, flooring, windows (or in vehicles with no windows or few windows, walls) or other aspects of the cabin of vehicles. When display 108 represents a passive display, display 108 may also include a projector or other image projection device capable of projecting or otherwise recreating an image on passive display 108. Furthermore, display 108 may include displays integrated into driver-side dashboards that virtually represent physical instrument clusters (showing speed, revolutions per minute, engine temperature, etc.).

Display 108 may also represent displays in wired or wireless communication with vehicle 100 where vehicle 100 is autonomous. Display 108 may, for example, represent a computing device, such as a laptop computer, a heads-up display, a head-mounted display, an augmented reality computing device or display (such as "smart glasses"), a virtual reality computing device or display, a mobile phone (including a so-called "smart phone"), a tablet computer, a gaming system, or another type of computing device capable of acting as an extension of or in place of a display integrated into vehicle 100.

User interface 110 may represent any type of physical or virtual interface with which a user may interface to control various functionalities of vehicle 100. User interface 110 may include physical buttons, knobs, sliders, and/or other physical control implements. User interface 110 may also include a virtual interface whereby an occupant of vehicle 100 interacts with virtual buttons, knobs, sliders or other virtual interface elements via, as one example, a touch-sensitive screen, or via a touchless interface. The occupant may interface with user interface 110 to control one or more of a climate within vehicle 100, audio playback by vehicle 100, video playback by vehicle 100, transmissions (such as cellphone calls) through vehicle 100, or any other operation capable of being performed by vehicle 100.

User interface 110 may also represent interfaces extended to display 108 when acting as an extension of or in place of a display integrated into vehicle 100. That is, user interface 110 may include virtual interfaces presented via a heads-up display (HUD), augmented reality computing device, virtual reality computing device or display, tablet computer, or any other of the different types of extended displays listed above.

In the context of vehicle 100, user interface 110 may further represent physical elements used for manually or semi-manually controlling vehicle 100. For example, user interface 110 may include one or more steering wheels for controlling a direction of travel of vehicle 100, one or more pedals for controlling a rate of travel of vehicle 100, one or more hand brakes, etc.

In the example of FIG. 1, processor 102, GPU 104, system memory 106, display 108, and UI 110 may collectively represent, at least in part, what is referred to as a head unit 112 (or, in other words, a "vehicle head unit 112") in the automotive context. Head unit 112 may represent any integrated or separate computing device capable of interfacing with various aspects of vehicle 100 and/or providing entertainment for occupants and/or information regarding vehicle 100 (where such head units may be referred to as "infotainment units" or "infotainment systems").

As further shown in the example of FIG. 1, vehicle 100 may include a number of different vehicle systems 114A-114N ("vehicle systems 114"). Vehicle systems 114 may include a heating, ventilation, air conditioning (HVAC) system or a temperature regulation system (e.g., which may include heated and/or cooled seats in addition to the HVAC system) (either or both of which may also be referred to as a climate system herein), a lighting system (for providing interior and/or exterior lighting), a seat control system (for adjusting a position of occupant seating), a mirror control system (for controlling interior and/or exterior mirrors, including rearview mirrors, side mirrors, visor mirrors, etc.), a windshield wiper control system, an entertainment system (for controlling radio playback, video playback, image display, etc.), a safety assistant system (for controlling parking assistance, back-up assistance, etc.), a drive mode system (for controlling the suspension, transmission, etc.) a sun-/moon-roof control system (for controlling sunroofs and/or moonroofs), and any other type of vehicle system capable of control via a head unit, such as head unit 112. An example of vehicle systems 114 may include an electronic control unit (ECU), which may control any of the foregoing examples of vehicle systems 114.

Head unit 112 may issue one or more messages as commands to vehicle systems 114 to change an operational state of one or more of vehicle systems 114. Head unit 112 may execute an operating system ("OS") 116 that is configured to provide interactions with vehicle systems 114. OS 116 may represent a dedicated, internally developed operating system that is programmed by the manufacturer of vehicle 100 or a different third party operating system developed outside of the manufacture of vehicle 100.

Although described with respect to a third party application independently developed by the third party, various aspects of the techniques may apply to a dedicated OS developed by the manufacturer (meaning, in other words, a first party) or a hybrid in which OSes are executed concurrently to support both a first part OS and a third party OS. Furthermore, while described with respect to a natively executed OS (meaning head unit 112 executes OS 116), in some examples a separate computing device may execute OS 116 in which case OS 116 represents a projected instance of OS 116. The projected instance of OS 116 may refer to a graphical user interface (GUI) that is transmitted (by the separate computing device, such as a mobile phone—including a so-called "smartphone," a laptop computer, a portable gaming device, or any other mobile computing device).

In any event, OS 116 may include a kernel executing in so-called kernel space that provides a secure operating environment in which OS 116 may interact with underlying hardware, such as processor 102, GPU 104, system memory 106, and display 108. The kernel of OS 116 may present an interface, such as an application programming interface (API) 119, by which applications executing in a higher (compared to kernel space) application space (AS) 120, may interface, via the kernel, with the underlying hardware. This OS level API (which is the API presented by the kernel) 119 may provide certain features, such as interrupts, by which to identify changes in state of the underlying hardware, such as communications being received via vehicle system 114 over an established network via an interface 111 ("INT 111").

Interface 111 may represent any type of interface by which head unit 112 may communicate with vehicle systems 114. Interface 111 may correspond to a controller area network (CAN) interface, a layer two interface (such as an Ethernet interface), a layer three interface (such as an Internet protocol—IP—interface), or any other type of interface implemented in vehicles, such as vehicle 100. Interface 111 may include a physical port that interconnects with dedicated network hardware in the form of a wire (e.g., an Ethernet cable) or other physical connection, or a virtual interface executed by underlying processors (represented by interface 111) that manage interconnectivity between head unit 112 and vehicle systems 114 via a wireless Ethernet network.

In the example of FIG. 1, interface 111 is assumed to be a hardware (or in other words physical) layer two interface that is coupled to a physical cable to each of vehicle systems 114. Within this assumption, the layer two interface is also assumed to be a hardware Ethernet interface that is physically coupled via an Ethernet cable (via a hardware, or in other words physical, Ethernet port) to each of vehicle systems 114 via a physical and/or virtual hub and/or switch that operates according to a layer two protocol (e.g., Ethernet) to switch (or in some instances route—when the layer two switch/hub is considered a layer 2.5 hub/switch) frames (or some other data unit, such as packets in the case of layer three networks) between vehicle head unit 112 and vehicle systems 114 (where such hub/switch is not shown for ease of illustration purposes).

Manufacturers of vehicle 100 may configure various virtual local area networks (VLANs) that create virtual networks between one or more of vehicle systems 114 and vehicle head unit 112. In this instance, VLANs may provide independent networks (e.g., virtual networks, which are logically separate from one another) that establish connectivity between different vehicle systems 114 and head unit 112 (e.g., vehicle system 114A may establish communication with vehicle head unit 112 via the Ethernet network and VLAN A, vehicle system 114B may establish communication via the Ethernet network and VLAN B with vehicle head unit 112, etc.). While described as separate VLANS (e.g., VLAN A, B, etc.) for each individual vehicle system 114, two or more vehicle systems 114 may communicate with vehicle head unit 112 via a single VLAN established over the underlying Ethernet network.

In other words, manufacturers of vehicles, such as vehicle 100, are beginning to introduce more sophisticated networks by which to facilitate communication between vehicle head unit 112 and vehicle systems 114. Such advances in network communication may provide many benefits in terms of being secure and hardened to exploitation while also offering high bandwidth communication that facilitates rapid transmission of data (e.g., on the order of gigabytes—GB—of data) that may enable next generation features (such as in-depth telematics, autonomous operation, over-the-air updates, etc.).

However, the introduction of sophisticated networking may require detailed hard-coding of virtual interfaces by which to couple OS 116 configured to be executed by head unit 112 to such networks (such as the above noted, VLANs). That is, OS 116 may not expose VLANs natively and require manufacturers to independently program (or in other words, "hard-code") connectivity between OS 116 and vehicle systems 114. These manufactures may resort to dedicated programming (e.g., according to C or C++ program languages) in order to expose the underlying VLANs executing over the hardware Ethernet network coupling vehicle head unit 112 and vehicle systems 114 to applications 118.

Further, the vehicle manufacturers may implement access control lists (ACLs) to grant or prohibit access to the VLANs from certain applications 118 executed by OS 116 within application space 120. The manufacturers may vet each of applications 118 in order to grant access to such VLANs so as to preserve safety and/or security. The manufacturers may independently (meaning, separate from the developer of OS 116) code such ACLs, including modifying OS 116, to provide such functionality. This divergence in development may result in difficulty in maintaining ACLs given that OS 116 may be updated over time, which requires redevelopment of the security of OS 116 (in terms of implementing ACLs for apps 118) to facilitate update of OS 116. The lack of native support in OS 116 for such ACLs in the context of vehicle 100 may reduce adoption of OS 116 while also exposing security and/or safety concerns.

In accordance with various aspects of the techniques described in this disclosure, OS 116 may be configured to perform efficient network management for applications 118 executed by vehicle head unit 112. Rather than resort to so-called "low-level" management of networks, various aspects of the techniques enable OS 116 executed by vehicle head unit 112 to present a single application programming interface (API) 119 by which to configure network access and control for applications 118 executed in an application space (as opposed to a secure kernel space) of the vehicle operating system represented by OS 116 (and as such may be referred to as "vehicle OS 116"). Via single API 119, applications 118 may register a call, with vehicle OS 116, for network access to particular vehicle networks that interconnect vehicle head unit 112 executing vehicle OS 116 to various vehicle systems 114. Vehicle OS 116 may be configured to implement access control lists (ACL) 121 by which to determine whether a particular application attempting to register a call for vehicle network access is able to access the underlying vehicle network. If authorized via ACL 121, vehicle OS 116 may configure an interface (which may be a virtual interface) by which the particular application may access the underlying vehicle network, including assigning a network address (e.g., an Internet protocol—IP—address).

In operation, OS 116 may obtain an indication of one or more vehicle networks. That is, manufacturers may configure each of the above noted VLANs within vehicle 100 to interconnect vehicle head unit 112 to one or more vehicle systems 114. Once configured, the manufacturer may register, via API 119, each of the VLANs with OS 116, while also interfacing with API 119 to configure ACL 121.

Vehicle head unit 112, and more specifically, processor 102 of vehicle head unit 112 may execute OS 116 that presents API 119 that provides function calls by which to configure the one or more vehicle networks within OS 116. The manufacturers may then only have to interface with API 119 to configure the vehicle networks and ACL 121 within OS 116. As OS 116 actively presents API 119, any development of OS 116 may result in active maintenance of API 119 that maintains a standard way (e.g., via function calls) to configure the vehicle networks within OS 116.

OS 116 may be initialized (during bootup and after bringing up the vehicle networks, which may result in configuring, via single API 119, one or more network interfaces for the one or more vehicle networks in OS 116 by which one or more applications 118, executing in an application space 120 presented by OS 116, interface with the one or more vehicle networks. OS 116 may configure these interfaces by at least in part assigning an address for each of the one or more network interfaces, which are used to distinguish between each interface (which again, may refer to virtual interface defined within OS 116). OS 116 may statically assign such addresses or resort to dynamic assignment of these addresses, where the addresses may include network address (or, in other words, layer three network addresses, such as an Internet protocol (IP) address). OS 116 may execute dynamically assign such addresses in accordance with a dynamic host configuration protocol.

OS 116 may also configure ACLs 121 for one or more of these interfaces within OS 116 that grant or deny access by applications 118 to the various interfaces by which OS 116 communicates with the vehicle networks. ACLs 121 may represent one form of application access rules for the network interfaces that control access by applications 118 to the one or more network interfaces.

In this way, rather than resort to complicated so-called "low-level" configuration in which manufacturers of vehicles, such as vehicle 100, independently statically configure (or, in other words, "hard code") vehicle network configuration for each application of applications 118, such vehicle manufacturers may program applications 118 or allow third party application developers to develop applications 118 that interface with single API 119 presented natively by vehicle OS 116 to perform network management. The vehicle manufacturers may deploy ACLs 121 that limit or allow access to the underlying vehicle networks based on application approval processes that conform with laws of various jurisdictions in which vehicles are sold.

Moreover, vehicle OS 116 may be developed to accommodate the various laws of jurisdictions while also enabling vehicle network access for applications 118 executed by the vehicle OS 116. Given that vehicle network access may be managed via single API 119, manufactures of vehicles may not require dedicated computer programmers to "hard code" network access, but may facilitate independent network management by application developers (including first party and third party application developers). As single API 119 is managed by the developers of vehicle OS 116, such vehicle network management may be supported natively as vehicle OS 116 undergoes additional development and revisions.

As such, single network management API 119 may facilitate more efficient operation of vehicle OS 116 while also improving access to vehicle networks by applications 118 executed by vehicle OS 116. Vehicle OS 116 may operate more efficiently as single API 119 may reduce errors introduced by such "hard coded" network management that may result in errors (security or otherwise) that may introduce issues of safety or vehicle network exploitation that results in efficient use of computing resources of vehicle head unit 112 (e.g., in terms of processor cycles, memory, memory bandwidth, and associated power). Further, given unified single API 119 for network management, application developers may secure access to certain vehicle networks via manufacture verification, while also allowing manufacturers to disable vehicle network access to vehicle systems 114 that may impose a security and/or safety risk, thereby improving the safety and/or security of vehicle 100 itself.

Figure 2:
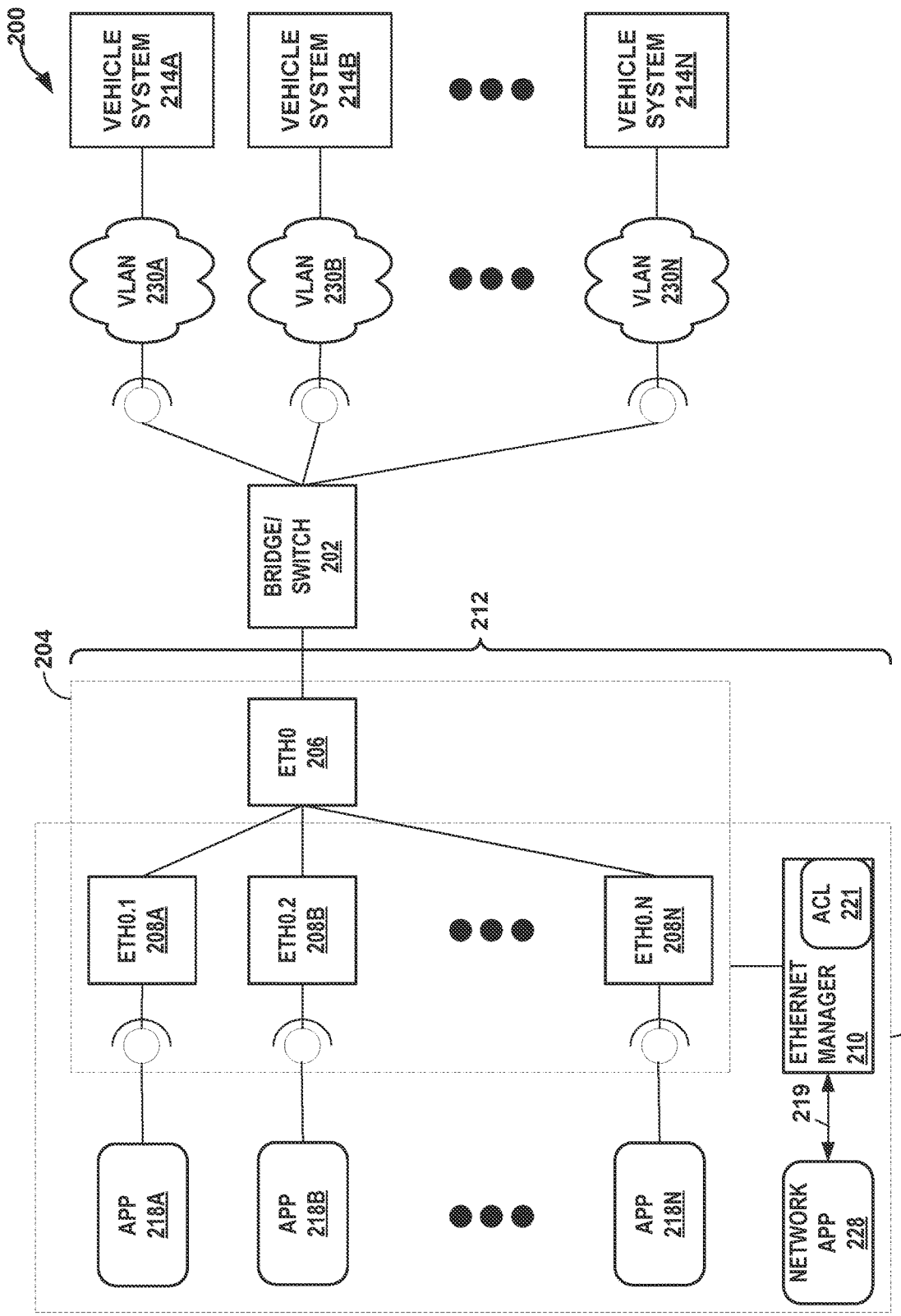
FIG. 2 is a block diagram illustrating a conceptual configuration of network management via a single application programming interface for the vehicle shown in the example of FIG. 1 in accordance with various aspects of the techniques described in this disclosure.

FIG. 2 is a block diagram illustrating a conceptual configuration of network management via a single application programming interface for the vehicle shown in the example of FIG. 1 in accordance with various aspects of the techniques described in this disclosure. In the example of FIG. 2, vehicle 200 may represent an example of vehicle 100 shown in the previous example of FIG. 1.

Vehicle 200 may include vehicle head unit 212 and vehicle systems 214 separated by a bridge and/or switch 202 (which may represent a physical bridge and/or switch or a logical—or in other words—virtual bridge and/or switch). Bridge and/or switch ("bridge/switch") 202 may represent a layer two network device or a layer 2.5 network device (that includes some ability to learn destinations and route frames/packets to those destinations rather than a layer two network device that broadcasts frames/packets out each port).

Vehicle head unit 212 may execute OS 216 along with applications ("apps") 218 in the manner described above with respect to vehicle head unit 112. Vehicle head unit 212 may also include an Ethernet interface 204 by which to establish Ethernet communication with bridge/switch 202. Ethernet refers to a suite of networking standards promulgated by the Institute of Electrical and Electronics Engineers (IEEE) as IEEE 802.3, which defines how wired and wireless layer two network communication is established and maintained in support of network communications. Ethernet interface 204 may conform to any layer two communication standard, but is assumed to operate in accordance with IEEE 802.3 for purposes of illustration. Ethernet interface 204.

Ethernet interface 204 includes a physical Ethernet port, denoted as Eth0 206 that couples, either wirelessly or via a physical wire (often referred to as an Ethernet cable) to bridge switch 206. Ethernet interface 204 also supports a number of virtual Ethernet ports denoted as Eth0.1 208A, Eth0.2 208B, . . . , Eth0.N 208N (which may also be referred to as "virtual Ethernet ports 208"). OS 116 may manage and maintain virtual Ethernet ports 208, defining such virtual Ethernet ports 208 for use by one or more of apps 218. Although shown in the example of FIG. 1 as each one of apps 118 interfacing with a single (and dedicated) virtual Ethernet port, apps 118 may request one or more virtual Ethernet ports 208 for various different reasons.

In order to support virtual Ethernet ports 208, OS 116 may include an Ethernet manager 210 that executes in kernel space (as opposed to the more restrictive and less privileged application space). Apps 218 may issue function calls associated with networking APIs that request virtual Ethernet ports 208, where Ethernet manager 210 may represent these networking APIs while also providing additional network management functionality to maintain Ethernet networks, including virtual Ethernet ports 208 (which may also be referred to as virtual Ethernet interfaces 208). OS 216 may also execute a network app 228 that supports configuration of networks, such as VLANs 230, within the overall Ethernet network shown in the example of FIG. 2. Network app 228 may invoke the single API 219 to interface with Ethernet manager 210 in order to configure the network shown in the example of FIG. 2.

As further shown in the example of FIG. 2, manufacturers of vehicle 200 may configure VLANs 230A-230N ("VLANs 230"). VLANs 230 represent, as noted briefly above, separately partitioned and isolated virtual networks that are partitioned and isolated at layer two. Each of VLANs 230 is assigned a unique VLAN tag (meaning unique within vehicle 200 and possible external networks depending on whether the network extends outside of vehicle 200). VLANs 230 may enable a single physical network to be partitioned into separate logically isolated networks.

API 219 may enable network app 228 to configure virtual Ethernet interfaces 208 that enable apps 218 executing within OS 216 to access VLANs 230, which may include IP configuration, setting network capabilities (which are present in OS 216 and used for defining various capabilities associated with the underlying network, such as the existence of a captive portal, bandwidth priorities, latency priorities, transport—such as universal system bus, personal area network, Ethernet, cellular, wireless, etc.), and the like. Moreover, network app 228 may interface with Ethernet manager 210 via API 219 to configure ACL 221 that control access by apps 218 to virtual Ethernet interfaces 208, which may be associated with one or more VLANs 230.

Figure 3:
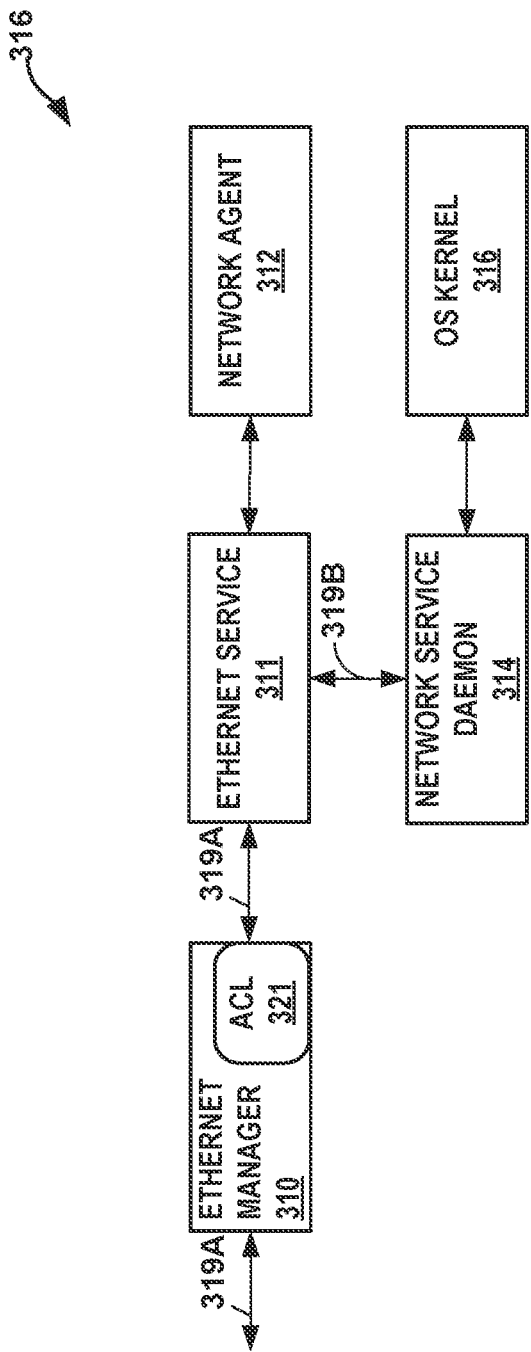
FIG. 3 is a block diagram illustrating, in more detail, the vehicle operating system shown in the example of FIGS. 1 and 2 that supports efficient network management in accordance with various aspects of the techniques described in this disclosure.

FIG. 3 is a block diagram illustrating, in more detail, the vehicle operating system shown in the example of FIGS. 1 and 2 that supports efficient network management in accordance with various aspects of the techniques described in this disclosure. In the example of FIG. 3, vehicle OS 316 includes above noted Ethernet manager 310 that manages network configuration for virtual Ethernet interfaces 208 by way of API 319. However, OS 316 includes two different portions of API 119, API 319A that provides an interface by which to configure interconnectivity between virtual Ethernet interfaces 208 and VLANs 230, and API 319B for managing ACL 321.

Vehicle OS 316 includes an Ethernet service 311, a network agent 312, a network service daemon 314, and an OS kernel 316 (each of which may resemble similarly named components of Unix-based and/or Linux-based operating systems). Ethernet service 311 may represent an OS level (which executes in the kernel space) service that implements functionality associated with Ethernet in terms of managing underlying hardware (such as a physical Ethernet interface), which also implements various APIs, such as backend API 319A for managing ACL 321 relative to user identifiers ("uid") rules for accessing vehicle networks.

Ethernet manager 310 may be invoked by apps, such as network app 228, to establish virtual Ethernet interfaces 208. Ethernet manager 310 may also be invoked (via function calls) to configure VLANs 230 within OS 116, defining network addresses, network capabilities, and ACL 121. Ethernet manager 310 is instantiated via a function call to the system service responsible for managing Ethernet communications (e.g., Ethernet service 311).

Once instantiated, network app 228 may invoke function associated with API 319A that is supported by Ethernet manager 310 to configure network access to vehicle systems 114 via VLANs 230. Network app 228 may also invoke functions associated with API 319A to define (or edit, delete, or otherwise manage) ACL 321. Ethernet manager 310 may in turn invoke Ethernet service 311 via API 319A to configure network access between one or more apps 118/218 and vehicle systems 114 via VLANs 230, including implementation of ACL 321. Ethernet service 311 may interface with network service daemon 314 via backend API 319B to configure ACL 321 at a network service layer, which may effectively prevent access to VLANs 230 from unauthorized applications using privileges assigned by OS kernel 316 (that are associated with a given user as identified by the uid).

Network agent 312 may assist in configuring network connectivity via VLANs 230 to vehicle systems 114. Network agent 312 may configure IP addresses and network capabilities responsive to Ethernet manager 310 invoking functions of API 319A, where Ethernet service 310 may interface with network agent 312 to secure IP addresses that are assigned to virtual Ethernet interfaces 208. Each of these updates to provide API 119 may impact underlying system code of OS 316 to provision network connectivity and associated ACL 321 between apps 118/218 and vehicle systems 114/214 via VLANs 230.

Figure 4:
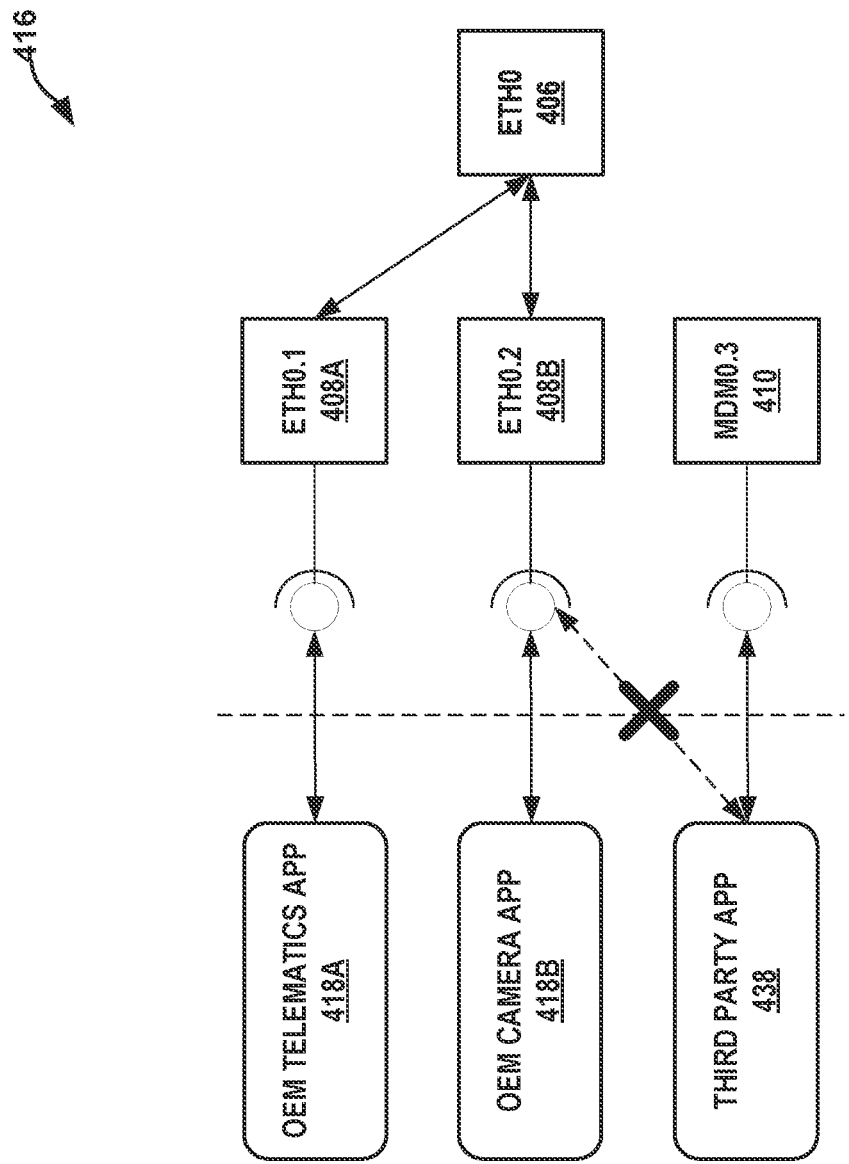
FIG. 4 is a block diagram illustrating how the vehicle operating system shown in the examples of FIGS. 1-3 may implement access control lists while performing network management in accordance with various aspects of the techniques described in this disclosure.

FIG. 4 is a block diagram illustrating how the vehicle operating system shown in the examples of FIGS. 1-3 may implement access control lists while performing network management in accordance with various aspects of the techniques described in this disclosure. In the example of FIG. 4, OS 416 may represent an example of OS 116 in which original equipment manufacturer (OEM) telematics app 418A and OEM camera app 418B (e.g., for viewing a backup camera or other camera system of the vehicle) execute in the application space along with a so-called third party app 438.

While each of OEM telematics app 418A, OEM camera app 418B, and third party application 438 may represent examples of applications 118 described above with respect to the examples shown in FIGS. 1 and 2, in some instances only OEM apps, such as OEM telematics app 418A and OEM camera app 418B may represent examples of applications 118. That is, for security and safety purposes access to certain vehicle systems 114/214 may be limited to signed OEM applications, such as OEM telematics app 418A and OEM camera 418B.

Given the above noted security and safety concerns, manufacturers may define ACL 121 to prohibit any application other than specifically authenticated applications, such as OEM telematics app 418A and OEM camera app 418B, from accessing VLANs 230 by which to access vehicle systems 114. In the example of FIG. 4, any attempt by third party app 438 to access VLAN 230B associated with Eth0.2 408B may be denied at the operating system level via OS 416. More specifically, network service daemon 314 may interface with OS kernel 316 to retrieve uid-based ACL 121 that specifically denies third party app 438 from accessing VLAN 230B and/or underlying Eth0.2 408B. In this way, safety and security may be preserved using single API 119/219/319A/319B by which to manage network access.

Figure 5:
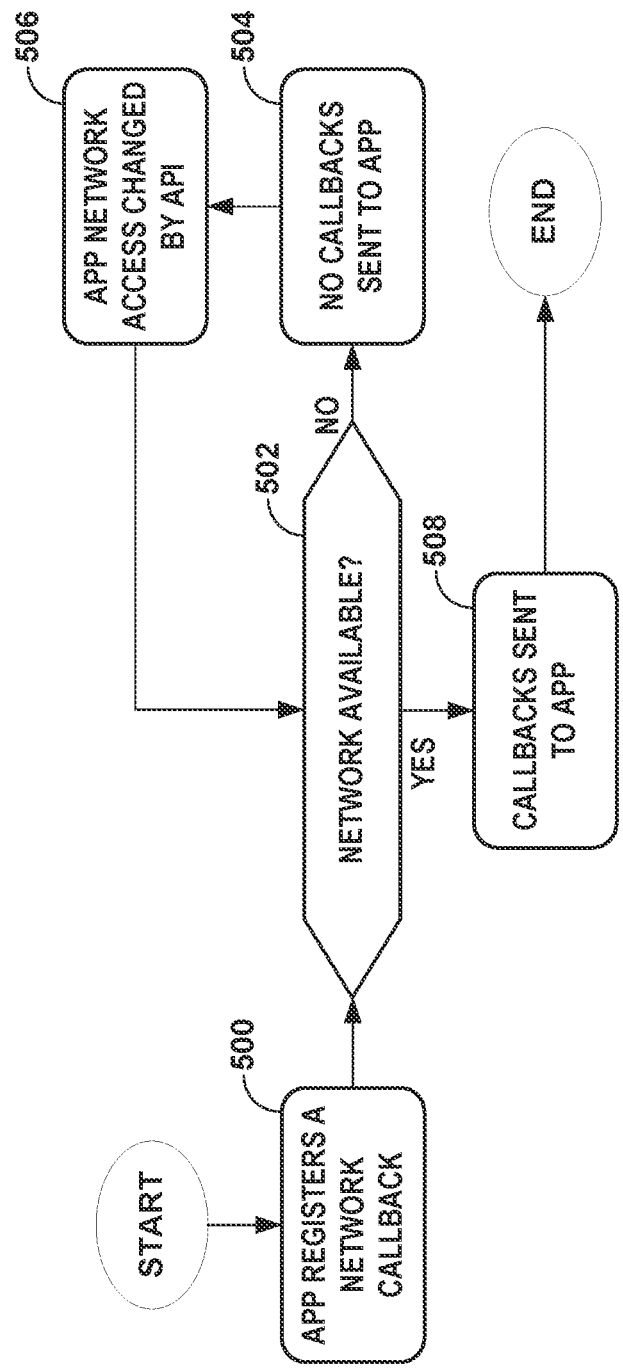
FIG. 5 is a diagram illustrating a state diagram representative of example operation of the vehicle operating system shown in the example of FIGS. 1 and 2 in performing network management in accordance with various aspects of the techniques described in this disclosure.

FIG. 5 is a diagram illustrating a state diagram representative of example operation of the vehicle operating system shown in the example of FIGS. 1 and 2 in performing network management in accordance with various aspects of the techniques described in this disclosure. In the example of FIG. 5, one or more of apps 118 may interface with single API 119 to register a network callback (500). By registering with Ethernet manager 210, apps 118 may receive callbacks that alert apps 118 to when a certain network is available, lost, and whether the registering one of apps 118 has access to the certain network. This network access includes the above noted Ethernet networks.

Apps 118 may register callbacks that specify the certain network in different ways. In some examples, the registered callbacks may define the network in terms of network characteristics, such as bandwidth, latency, signal to noise ratio, etc. The registered callbacks may also request callbacks only for networks that provide a certain quality of service (QoS), which is similar to network characteristics but usually defined in a hierarchy of network characteristics often with fallback QoS requirements. The registered callbacks may also define the network in terms of a type of network, such as wired vs. wireless, transport protocol, and/or by specifying which particular network is requested, such as a Bluetooth connection, Ethernet connection, etc.

When the network is not available ("NO" 502) (in that the registered callback specifications for the network are not met by an existing network registered with OS 216), OS 216 does not send back any callbacks to apps 118 (504), but the app network access may be changed by single API 119 (506). That is, single API 119 may configure additional networks (e.g., VLANs) after execution of OS 116 occurs by way of discovering new systems 114, addition of new systems 114 (e.g., by way of USB or other wired or wireless connectivity, etc.). As such, the Ethernet network may become available ("YES" 502), in which case OS 216 may send a callback to registered apps 118 alerting them that the Ethernet network (and/or associated one of VLANs 230) are available (508).

Figure 6:
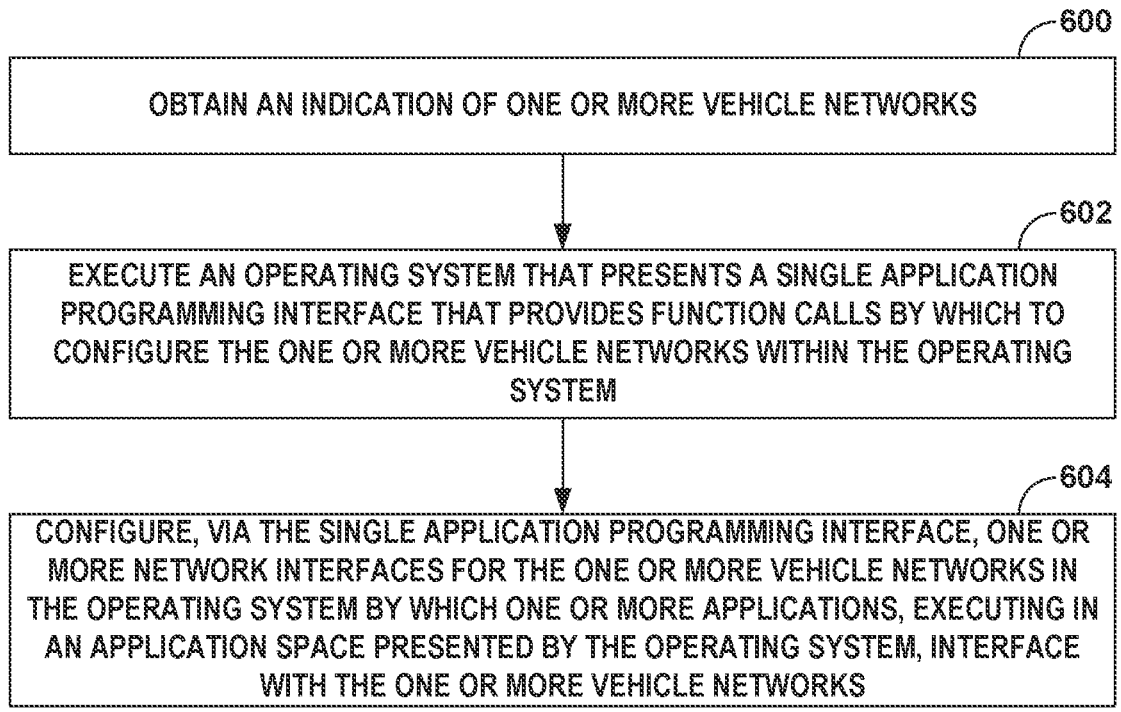
FIG. 6 is a flowchart illustrating example operation by the vehicle operating system shown in the example of FIG. 1 in performing various aspects of the network management techniques.

FIG. 6 is a flowchart illustrating example operation by the vehicle operating system shown in the example of FIG. 1 in performing various aspects of the network management techniques. Initially, OS 116 may obtain an indication of one or more vehicle networks (600). That is, manufacturers may configure each of the above noted VLANs within vehicle 100 to interconnect vehicle head unit 112 to one or more vehicle systems 114. Once configured, the manufacturer may register, via API 119, each of the VLANs with OS 116, while also interfacing with API 119 to configure ACL 121.

Vehicle head unit 112, and more specifically, processor 102 of vehicle head unit 112 may execute OS 116 that presents API 119 that provides function calls by which to configure the one or more vehicle networks within OS 116 (602). The manufacturers may then only have to interface with API 119 to configure the vehicle networks and ACL 121 within OS 116. As OS 116 actively presents API 119, any development of OS 116 may result in active maintenance of API 119 that maintains a standard way (e.g., via function calls) to configure the vehicle networks within OS 116.

OS 116 may be initialized (during bootup and after bringing up the vehicle networks, which may result in configuring, via single API 119, one or more network interfaces for the one or more vehicle networks in OS 116 by which one or more applications 118, executing in an application space (AS) 120 presented by OS 116, interface with the one or more vehicle networks (604). OS 116 may configure these interfaces by at least in part assigning an address for each of the one or more network interfaces, which are used to distinguish between each interface (which again, may refer to virtual interface defined within OS 116). OS 116 may statically assign such addresses or resort to dynamic assignment of these addresses, where the addresses may include network address (or, in other words, layer three network addresses, such as an Internet protocol (IP) address). OS 116 may execute dynamically assign such addresses in accordance with a dynamic host configuration protocol.

OS 116 may also configure ACLs 121 for one or more of these interfaces within OS 116 that grant or deny access by applications 118 to the various interfaces by which OS 116 communicates with the vehicle networks. ACLs 121 may represent one form of application access rules for the network interfaces that control access by applications 118 to the one or more network interfaces.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

This disclosure includes many examples. These examples include the following.

Example 1. 1. A method comprising: obtaining, by one or more processors of a vehicle head unit, an indication of one or more vehicle networks; executing, by the one or more processors, an operating system that presents a single application programming interface that provides function calls by which to configure the one or more vehicle networks within the operating system; and configuring, via the single application programming interface, one or more network interfaces for the one or more vehicle networks in the operating system by which one or more applications, executing in an application space presented by the operating system, interface with the one or more vehicle networks.

Example 2. The method of example 1, wherein configuring the one or more network interfaces includes configuring at least one network address for each of the one or more network interfaces.

Example 3. The method of example 2, wherein configuring the one or more network interfaces includes assigning the at least one network address for each of the one or more network interfaces in accordance with a dynamic host configuration protocol.

Example 4. The method of any combination of examples 1-3, wherein configuring the one or more network interfaces includes configuring application access rules for the network interfaces that control access by the one or more applications to the one or more network interfaces.

Example 5. The method of example 4, further comprising denying, based on the application access rules, an application access to the network interfaces.

Example 6. The method of any combination of examples 1-5, wherein the one or more vehicle networks comprises one or more layer two networks.

Example 7. The method of example 6, wherein the one or more vehicle network comprises one or more virtual local area networks executing over the one or more layer two networks.

Example 8. The method of example 7, wherein the one or more layer two networks include one or more Ethernet networks.

Example 9. The method of any combination of examples 1-8, wherein the operating system also includes a kernel space that is reserved for executing a privileged operating system kernel, and wherein the application space provides interfaces with which the one or more applications interact with the privileged operating system kernel.

Example 10. The method of any combination of examples 1-9, wherein the one or more vehicle networks are configured to interconnect the vehicle head unit to one or more vehicle systems of a vehicle.

Example 11. The method of example 9, wherein the one or more vehicle systems include a heating, ventilation, and air conditioning system, a seat control system, an internal lighting system, an external lighting system, a communication system, a mirror control system, and a video system.

12. A vehicle head unit comprising: a memory configured to store an operating system; and one or more processors configured to: obtain an indication of one or more vehicle networks; execute the operating system that presents a single application programming interface that provides function calls by which to configure the one or more vehicle networks within the operating system; and configure, via the single application programming interface, one or more network interfaces for the one or more vehicle networks in the operating system by which one or more applications, executing in an application space presented by the operating system, interface with the one or more vehicle networks.

Example 13. The vehicle head unit of example 12, wherein the one or more processors are, when configuring the one or more network interfaces, configured to configure at least one network address for each of the one or more network interfaces.

Example 14. The vehicle head unit of example 13, wherein the one or more processors are, when configuring the one or more network interfaces, configured to assign the at least one network address for each of the one or more network interfaces in accordance with a dynamic host configuration protocol.

Example 15. The vehicle head unit of any combination of examples 12-14, wherein the one or more processors are, when configuring the one or more network interfaces, configured to configure application access rules for the network interfaces that control access by the one or more applications to the one or more network interfaces.

Example 16. The vehicle head unit of example 15, wherein the one or more processors are further configured to deny, based on the application access rules, an application access to the network interfaces.

Example 17. The vehicle head unit of any combination of examples 12-16, wherein the one or more vehicle networks comprises one or more layer two networks.

Example 18. The vehicle head unit of example 17, wherein the one or more vehicle network comprises one or more virtual local area networks executing over the one or more layer two networks.

Example 19. The vehicle head unit of example 18, wherein the one or more layer two networks include one or more Ethernet networks.

Example 20. A non-transitory computer-readable storage medium having instructions stored thereon that, when executed, cause one or more processors of a vehicle head unit to: obtain an indication of one or more vehicle networks; execute an operating system that presents a single application programming interface that provides function calls by which to configure the one or more vehicle networks within the operating system; and configure, via the single application programming interface, one or more network interfaces for the one or more vehicle networks in the operating system by which one or more applications, executing in an application space presented by the operating system, interface with the one or more vehicle networks.

Various embodiments have been described. These and other embodiments are within the scope of the following claims.

What is claimed is:

1. A method comprising:
obtaining, by one or more processors of a vehicle head unit, an indication of one or more vehicle networks;
executing, by the one or more processors, an operating system that presents a single application programming interface that provides function calls by which to configure the one or more vehicle networks within the operating system; and
configuring, via the single application programming interface, one or more network interfaces for the one or more vehicle networks in the operating system by which one or more applications, executing in an application space presented by the operating system, interface with the one or more vehicle networks, wherein configuring the one or more network interfaces includes configuring application access rules for the network interfaces that control access by the one or more applications to the one or more network interfaces based on application approval processes.

2. The method of claim 1, wherein configuring the one or more network interfaces includes configuring at least one network address for each of the one or more network interfaces.

3. The method of claim 2, wherein configuring the one or more network interfaces includes assigning the at least one network address for each of the one or more network interfaces in accordance with a dynamic host configuration protocol.

4. The method of claim 1, further comprising denying, based on the application access rules, an application access to the network interfaces.

5. The method of claim 1, wherein the one or more vehicle networks comprises one or more layer two networks.

6. The method of claim 5, wherein the one or more vehicle network comprises one or more virtual local area networks executing over the one or more layer two networks.

7. The method of claim 6, wherein the one or more layer two networks include one or more Ethernet networks.

8. The method of claim 1,
wherein the operating system also includes a kernel space that is reserved for executing a privileged operating system kernel, and
wherein the application space provides interfaces with which the one or more applications interact with the privileged operating system kernel.

9. The method of claim 1, wherein the one or more vehicle networks are configured to interconnect the vehicle head unit to one or more vehicle systems of a vehicle.

10. The method of claim 9, wherein the one or more vehicle systems include a heating, ventilation, and air conditioning system, a seat control system, an internal lighting system, an external lighting system, a communication system, a mirror control system, and a video system.

11. A vehicle head unit comprising:
a memory configured to store an operating system; and
one or more processors configured to:
obtain an indication of one or more vehicle networks;
execute the operating system that presents a single application programming interface that provides function calls by which to configure the one or more vehicle networks within the operating system;
configure, via the single application programming interface, one or more network interfaces for the one or more vehicle networks in the operating system by which one or more applications, executing in an application space presented by the operating system, interface with the one or more vehicle networks; and
configure application access rules for the network interfaces that control access by the one or more applications to the one or more network interfaces based on application approval processes.

12. The vehicle head unit of claim 11, wherein the one or more processors are, when configuring the one or more network interfaces, configured to configure at least one network address for each of the one or more network interfaces.

13. The vehicle head unit of claim 12, wherein the one or more processors are, when configuring the one or more network interfaces, configured to assign the at least one network address for each of the one or more network interfaces in accordance with a dynamic host configuration protocol.

14. The vehicle head unit of claim 13, wherein the one or more processors are further configured to deny, based on the application access rules, an application access to the network interfaces.

15. The vehicle head unit of claim 11, wherein the one or more vehicle networks comprises one or more layer two networks.

16. The vehicle head unit of claim 15, wherein the one or more vehicle network comprises one or more virtual local area networks executing over the one or more layer two networks.

17. The vehicle head unit of claim 16, wherein the one or more layer two networks include one or more Ethernet networks.

18. A non-transitory computer-readable storage medium having instructions stored thereon that, when executed, cause one or more processors of a vehicle head unit to:
obtain an indication of one or more vehicle networks;
execute an operating system that presents a single application programming interface that provides function calls by which to configure the one or more vehicle networks within the operating system; and
configure, via the single application programming interface, one or more network interfaces for the one or more vehicle networks in the operating system by which one or more applications, executing in an application space presented by the operating system, interface with the one or more vehicle networks; and
configure application access rules for the network interfaces that control access by the one or more applications to the one or more network interfaces based on application approval processes.

* * * * *